US008050656B2

(12) United States Patent
Narasimha

(10) Patent No.: US 8,050,656 B2
(45) Date of Patent: Nov. 1, 2011

(54) WIRELESS COMMUNICATION DEVICE AND METHOD FOR MAKING A SECURE TRANSFER OF A COMMUNICATION CONNECTION

(75) Inventor: Murali Narasimha, Grayslake, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 742 days.

(21) Appl. No.: 11/028,871

(22) Filed: Jan. 4, 2005

(65) Prior Publication Data

US 2006/0148451 A1    Jul. 6, 2006

(51) Int. Cl.
*H04M 1/16* (2006.01)
(52) U.S. Cl. ......... 455/411; 455/436; 455/444; 370/331
(58) Field of Classification Search .................. 455/411, 455/410, 414.1, 432.1, 435.1, 440, 444, 436; 370/331, 338
See application file for complete search history.

(56) References Cited

U.S. PATENT DOCUMENTS

| | | | | |
|---|---|---|---|---|
| 6,108,546 | A * | 8/2000 | Kusaki et al. ................. | 455/436 |
| 6,879,600 | B1 * | 4/2005 | Jones et al. ................... | 370/466 |
| 7,010,300 | B1 * | 3/2006 | Jones et al. ................... | 455/439 |
| 7,054,627 | B1 * | 5/2006 | Hillman ...................... | 455/422.1 |
| 7,721,106 | B2 * | 5/2010 | Zhang .......................... | 713/182 |
| 2002/0085516 | A1 | 7/2002 | Bridgelall | |
| 2003/0134638 | A1 * | 7/2003 | Sundar et al. ................ | 455/435 |
| 2004/0116120 | A1 * | 6/2004 | Gallagher et al. ............ | 455/436 |
| 2004/0147246 | A1 * | 7/2004 | Kim ............................. | 455/411 |
| 2004/0165563 | A1 * | 8/2004 | Hsu et al. ..................... | 370/338 |
| 2004/0199637 | A1 * | 10/2004 | Li et al. ........................ | 709/227 |
| 2005/0153692 | A1 * | 7/2005 | Hwang et al. ................ | 455/434 |
| 2005/0181805 | A1 * | 8/2005 | Gallagher .................... | 455/456.1 |
| 2005/0186948 | A1 * | 8/2005 | Gallagher et al. .......... | 455/414.1 |
| 2005/0237978 | A1 * | 10/2005 | Segal ............................ | 370/331 |
| 2006/0025138 | A1 * | 2/2006 | Kotzin ......................... | 455/445 |
| 2006/0040656 | A1 * | 2/2006 | Kotzin ......................... | 455/426.2 |
| 2006/0056448 | A1 * | 3/2006 | Zaki et al. .................... | 370/466 |
| 2006/0083199 | A1 * | 4/2006 | Yang ............................ | 370/331 |
| 2006/0084417 | A1 * | 4/2006 | Melpignano et al. ......... | 455/418 |
| 2006/0094431 | A1 * | 5/2006 | Saifullah et al. ............. | 455/436 |
| 2006/0111115 | A1 * | 5/2006 | Marin et al. .................. | 455/442 |

FOREIGN PATENT DOCUMENTS

| WO | WO 02/062094 A2 | 8/2002 |
|---|---|---|
| WO | WO 03/065654 A1 | 8/2003 |

OTHER PUBLICATIONS

M. Cappiello, A. Floris, L. Veltri; "Mobiity Amongst Heterogeneous Networks With AAA Support"; 2002 IEEE; pp. 2064-2069.
H. Wang, A. R. Prasad; "Security Context Transfer in Vertical Handover"; 2003 IEEE; pp. 2775-2779.

* cited by examiner

*Primary Examiner* — Kamran Afshar
*Assistant Examiner* — Khawar Iqbal

(57) ABSTRACT

A wireless communication device and method for making a secure transfer of a communication connection from a direct connection with a cellular network to a connection via a wireless local area network is provided. The device and method are adapted for detecting the presence of the wireless communication device within the communication coverage area of the wireless local area network and authenticating the wireless communication device with the wireless local area network. After authenticating the wireless communication device with the wireless local area network, a handoff is requested from the cellular network to the wireless local area network, where a secure connection between the mobile station and the cellular network via the wireless local area network is established, and then the direct connection with the cellular network is broken.

18 Claims, 4 Drawing Sheets

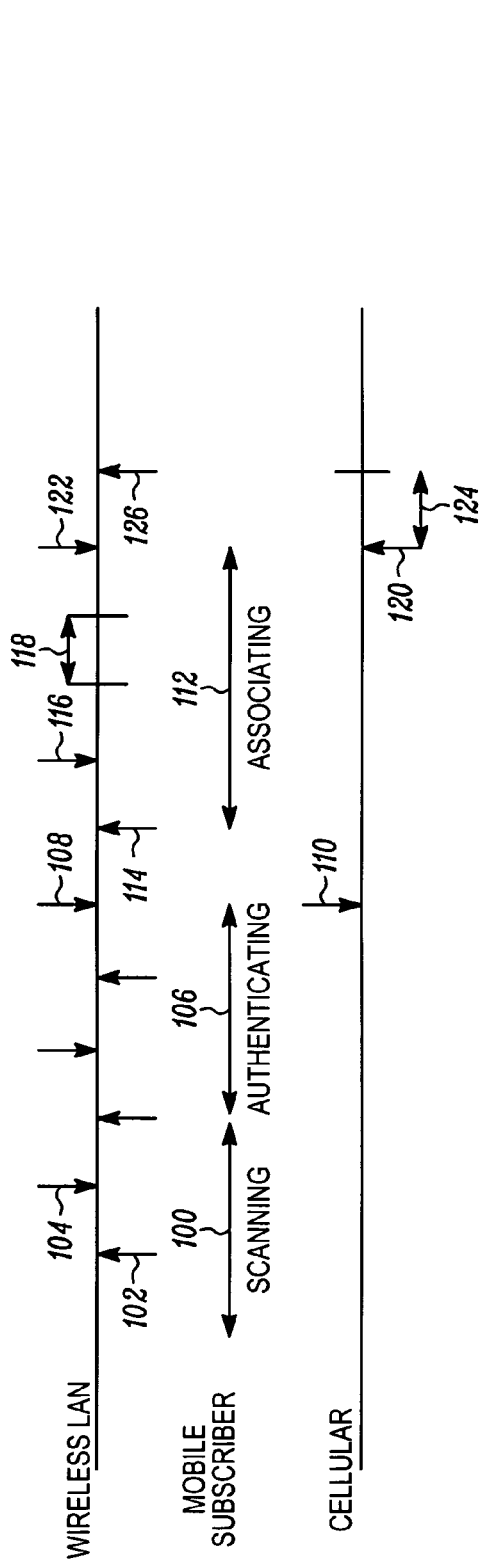
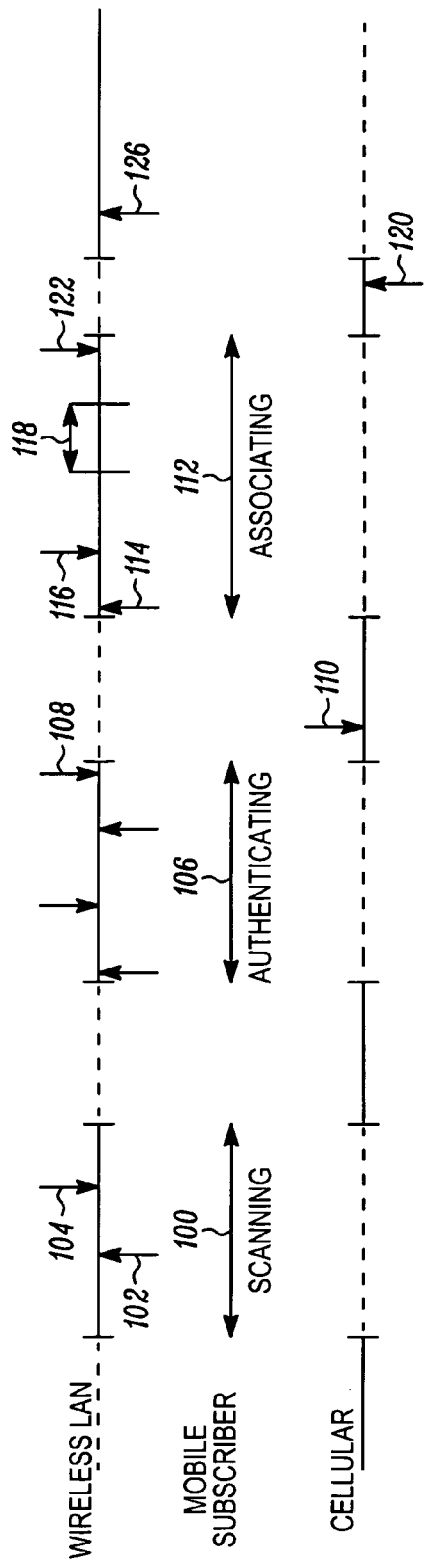

WIRELESS COMMUNICATION DEVICE AND METHOD FOR MAKING A SECURE TRANSFER OF A COMMUNICATION CONNECTION

FIELD OF THE INVENTION

The present invention relates generally to the hand off of a communication connection between networks. More particularly, the present invention relates to making a secure transfer of a mobile station communication connection from a direct connection with a cellular network to a connection via a wireless local area network.

BACKGROUND OF THE INVENTION

Different networks have different features and consequences of use. For example, a prevalent cost which is incurred in connection with using a cellular based radio telephone systems are connection charges, which typically accumulate in proportion to the amount of cellular resources used in making a call, which is often measured in terms of the duration of a call. This is due at least in part to the ongoing costs of operating and maintaining the cellular based infrastructure, including costs of the equipment, the power necessary for operating the equipment, and the airwave resources in the form of the licensed frequency spectrum.

However the cellular networks typically benefit from a relatively large coverage area, which enables a communication connection to be established and maintained over the same. Nevertheless, there are environments within the coverage area of a network in which cellular connections have historically experienced some degree of degradation, such as inside a building, where the walls and the roof of the building can reflect and/or absorb the cellular signals.

Alternatively, wireless local area networks have been developed for providing localized wireless connectivity between various devices and a packet data network, such as the Internet. While a cellular signal may have difficulty penetrating some buildings, wireless networks are often deployed in such a manner so as to specifically provide communication coverage within a building. Furthermore, the cost of deploying and maintaining a wireless local area network, is traditionally much less, due at least in part to the shorter transmission ranges, which results in the ability of the network to use less expensive equipment, which correspondingly uses less operational power. Still further because the transmission ranges are shorter, there is less possibility of interference between networks, and so the same shared frequencies can generally be re-used, which enables the network to be deployed without needing to obtain a license for dedicated frequencies, and in fact generally make use of a common set of shared frequencies which have been specifically set aside for such an application.

Still further, the evolution of the various networks including for example the expansion of the cellular networks to support packet data services and enable connectivity to the Internet, has generally resulted in many of the wireless local area networks and the cellular networks having common points of connection through which information can be conveyed between the networks. The common points of connection, in turn, can be used to create alternative communication paths between the mobile stations and the one or more networks, thereby potentially enabling the mobile subscriber to selectively make use of each of the networks in establishing a communication connection, which allows one greater control in attempting to make more optimal use of the available network resources. Still further, the mobile station will have greater flexibility if the mobile station could facilitate the transition between the various alternative communication paths at any time including when a current communication connection already exists, in addition to when a mobile station may be idle.

Consequently, a wireless communication device and method, which is capable of making a secure transfer of a mobile station communication connection from a direct connection with a cellular network to a connection via a wireless local area network, would be beneficial.

SUMMARY OF THE INVENTION

The present invention provides for a method for making a secure transfer of a mobile station communication connection from a direct connection with a cellular network to a connection via a wireless local area network. The method includes detecting by a mobile station, the presence of the mobile station within the communication coverage area of a wireless local area network. The mobile station is then authenticated with the wireless local area network, and a handoff from the cellular network to the wireless local area network is requested. A secure connection is then established between the mobile station and the cellular network via the wireless local area network, and the direct connection with the cellular network is broken.

In at least one embodiment, establishing a secure connection between the mobile station and the cellular network via the wireless local area network includes the setup of a secure tunnel.

In at least a further embodiment, the communication via the wireless local area network prior to breaking the direct connection with the cellular network will include information which is communicated concurrently via the direct connection and the secure connection via the wireless local area network.

The present invention further provides a wireless communication device including a wireless communication interface including one or more transceivers which are adapted for establishing a wireless communication connection, and a controller adapted for making a secure transfer of a communication connection from a direct connection with a cellular network to a connection via a wireless local area network. The controller includes a detection module adapted for detecting the presence of the wireless communication device within the communication coverage area of a wireless local area network. The controller further includes an authentication module adapted for establishing the identity of the wireless communication device and the authority of the wireless communication device to communicate via the wireless local area network and initiating a handoff request from the cellular network to the wireless local area network. The controller still further includes an association module adapted for establishing a secure connection between the wireless communication device and the cellular network via the wireless local area network and instructing the cellular network to break the direct connection with the cellular network.

In at least one embodiment, the wireless communication interface includes a first transceiver adapted for communicating with the cellular network and a second transceiver adapted for communicating with the wireless local area network.

In at least a further embodiment, the wireless communication device is a radio telephone.

These and other features, and advantages of this invention are evident from the following description of one or more preferred embodiments of this invention, with reference to the accompanying drawings.

BRIEF DESCRIPTION OF THE FIGURES

The present invention will be described by way of exemplary embodiments, but not limitations, illustrated in the accompanying drawings in which like references denote similar elements, and in which:

FIG. 3 is an exemplary timing diagram of the communication signals conveyed between the mobile station, the wireless local area network, and the cellular network, in instances where the mobile station is capable of maintaining multiple concurrent communication connections, in accordance with at least one embodiment of the present invention;

FIG. 4 is an exemplary timing diagram of the communication signals conveyed between the mobile station, the wireless local area network, and the cellular network, in instances where a single radio is used to alternatively communicate with the wireless local area network and the cellular network, in accordance with at least one embodiment of the present invention;

DETAILED DESCRIPTION

As required, detailed embodiments of the present invention are disclosed herein, however, it is to be understood that the disclosed embodiments are merely exemplary of the invention, which can be embodied in various forms. Therefore, specific structural and functional details disclosed herein are not to be interpreted as limiting, but merely serve as a basis for the claims and as a representative basis for teaching one skilled in the art to variously employ the present invention in virtually any appropriately detailed structure. Further, the terms and phrases used herein are not intended to be limiting, but rather, to provide an understandable description of the invention.

Figure 1:
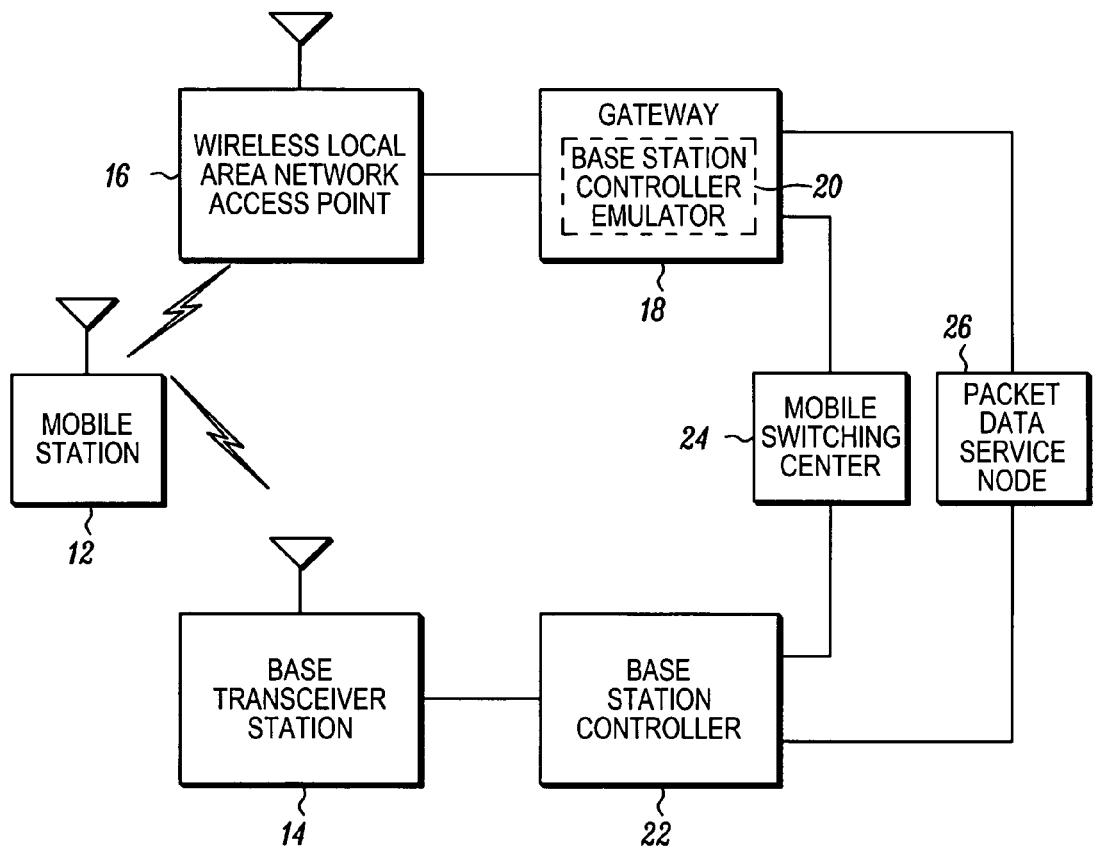
FIG. 1 is a block diagram of an exemplary communication system illustrating an environment within which at least one embodiment of the present invention can operate.

FIG. 1 is a block diagram of an exemplary communication system 10 illustrating an environment within which at least one embodiment of the present invention can operate. The communication system includes a mobile station 12, which is adapted for communicating with each of a base station transceiver 14 associated with a cellular network, and a wireless local area network access point 16 associated with a wireless local area network. While a mobile station is specifically identified, the present invention is equally applicable to any wireless communication device, which is capable of communicating with each of a cellular network and a wireless local area network.

While in at least one instance the mobile station 12 and/or wireless communication device will take the form of a radio telephone, in other instances, the mobile station 12 and/or wireless communication device can take alternative forms, such as a personal or laptop computer, a cellular telephone, a selective call receiver, a pager, a cordless telephone, an audio player, a personal digital assistant, or the like. One skilled in the art will readily appreciate that the present invention is equally applicable to other types of devices, without departing from the teachings of the present invention.

The wireless local area network access point 16, which will in at least some instances form part of a basic service set including one or more devices communicatively coupled using applications and protocols, which are consistent with a wireless local area network, such as a network which is in conformance with the IEEE 802.11 standard, or the Bluetooth standard, is coupled to a gateway 18 or router, which couples the wireless local area network to one or more other networks, such as a packet data network like the Internet. In at least some instances, the gateway 18 will incorporate a base station controller emulator 20, which will more readily facilitate communication with a cellular network and/or the mobile station 12. The base transceiver station 14, in at least the illustrated embodiment is coupled to a base station controller 22. The cellular network generally could operate in accordance with any of one or more cellular network standards, at least a couple of examples include Code Division Multiple Access (CDMA), Global System for Mobile Communications (GSM), General Packet Radio System (GPRS), Universal Mobile Telecommunication Service (UMTS), and variants thereof.

In the illustrated embodiment, the base station controller 22 of the cellular network is coupled to the gateway 18 of the wireless local area network via at least a couple of common points of connection, namely a mobile switching center 24, which generally can support the handling of circuit switched communication connections, and a packet data service node 26, which generally can support the handling of packet data communication connections, via which the communication of information can be routed between the cellular network and the wireless local area network. The particular route, which is selected, in many instances, is largely dependent upon the type of communication connection (i.e. circuit switched, or packet data, etc.), via which the information is being communicated.

Figure 2:
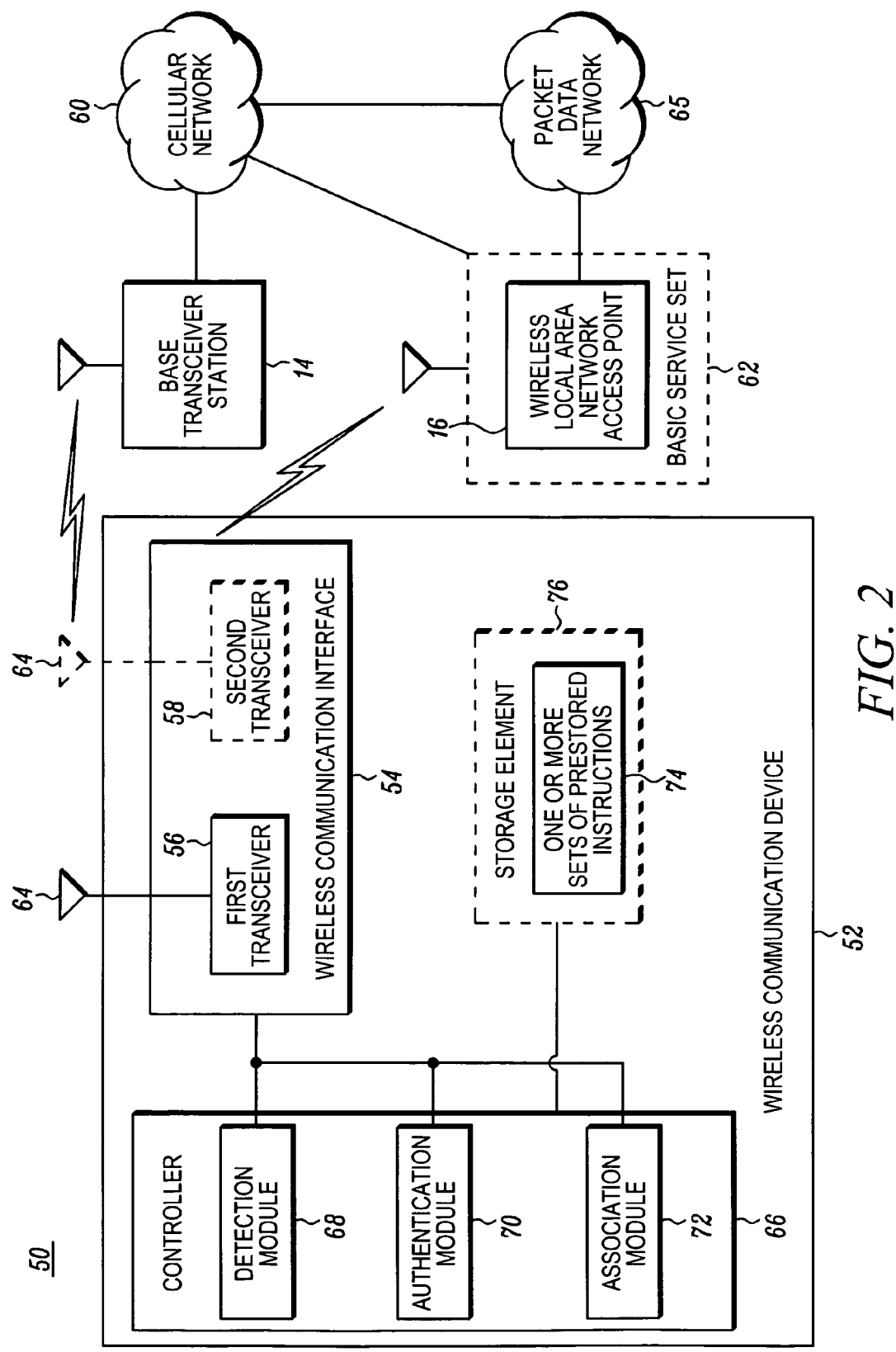
FIG. 2 is a block diagram of an exemplary communication system including a more detailed block diagram of a wireless communication device and/or mobile station, in accordance with at least one embodiment of the present invention.

FIG. 2 is a block diagram of an exemplary communication system 50 including a more detailed block diagram of a wireless communication device 52 and/or mobile station 12, in accordance with at least one embodiment of the present invention. The wireless communication device 52 includes a wireless communication interface 54, which generally has one or more transceivers, such as a first transceiver 56 and a second transceiver 58. Each of the transceivers is adapted for communicating wirelessly with the one or more of the cellular network 60 and the wireless local area network, which generally conforms in size and scope to the corresponding basic service set 62, via one or more antennas 64. As noted previously, the wireless local area network can potentially share a couple of points of connection with the cellular network, at least one of which can include portions of a packet data network 65.

If the wireless communication interface 54 includes at least a pair of transceivers 56, 58, then the transceivers 56, 58 may be able to better support a simultaneous communication connection with each of the cellular network 60 and the wireless local area network. Where the wireless communication interface includes only a single transceiver 56, the single transceiver 56 may need to be controlled so as to alternatively communicate with each of the cellular network 60 and the wireless local area network.

The wireless communication device 52 additionally includes a controller 66, which is adapted for making a secure transfer of a communication connection from a direct connection with a cellular network 60 to a connection via a wireless local area network. The controller 66 includes a detection module 68, which is adapted for detecting the presence of the mobile station within the communication coverage area of a wireless local area network, wherein the detection can be the result of observing (i.e. scanning for) suitable energy levels and correspondingly decoding one or more signals in the relevant frequencies, and/or can be the result of receiving a response to a probing communication or request. As part of decoding the one or more signals, the detection module may synchronize a timer (not shown) which is associated with the wireless communication interface used to communicate with a basic service set.

The controller 66 additionally includes an authentication module 70, which is adapted for establishing the identity of the wireless communication device 52 relative to the wireless local area network, and to obtain the authority of the wireless communication device 52 to communicate via the wireless local area network. The authentication module 70 is additionally adapted to initiate a handoff request from the cellular network 60, which may include sending identification information to the cellular network 60, which enables the cellular network to identify the wireless communication device and/or mobile station, via the wireless local area network. The identification information can include sending basic service set information.

The controller 66 still further includes an association module 72, which is adapted for establishing a secure connection between the wireless communication device 52 and the cellular network 60 via the wireless local area network and instructing the cellular network 60 to break the direct connection with the cellular network 60. Establishing a secure connection between the wireless communication device 52 and the cellular network 60 via the wireless local area network can include the wireless communication device 52 requesting an association with the wireless local area network, and still further generally includes the establishment of a secure tunnel, where upon establishing a secure tunnel, the communication of information via the wireless local area network is initiated, which in at least some instances, can be communicated concurrently with the same information communicated via the direct connection. In at least some embodiments, the termination of the direct connection can be initiated in response to receiving an indication of handoff completion.

By initiating the communication of information via the wireless local area network after a secure tunnel is established a potential security loop hole is avoided, where non-secured information could otherwise be communicated. For example, the authentication can be performed and any encryption keys can be exchanged prior to an association of the wireless communication device with a wireless local area network access point 16. Still further by authenticating the wireless communication device 52 prior to requesting the handoff, and breaking the direct communication after receipt of an indication of hand off completion, the transition from the cellular network to the wireless local area network can occur in such a way that the handoff is made more quickly. As a result, some voice calls, which would otherwise be dropped, may be avoided.

In at least some embodiments, the at least portions of the controller 66 including the corresponding modules 68, 70, 72 can take the form of one or more sets 74 of prestored instructions, which are executed by one or more microprocessors. The one or more sets 74 of prestored instructions can be maintained in a storage element 76, which can be separate from or integrated as part of any microprocessor, which might form all or part of the controller. Still further one or more sets 74 of prestored instructions can include programming or software instructions and/or microcode. In the same and/or other embodiments, all or parts of the various elements including the detection module 68, the authentication module 70, and the association module 72 can be alternatively and/or partially implemented in hardware using discrete or integrated circuit elements, including logic gates and/or sequential state machines. However, one skilled in the art will readily appreciate that still further approaches are possible for implementing the same without departing from the teachings of the present invention.

The storage element 74 can include both volatile and non-volatile forms of memory, many types of which are well known to one skilled in the art. One such example includes a semiconductor memory, for example a read only memory. Other examples include a fixed drive or hard drive, which commonly stores information magnetically. However any form of data storage may be suitable, as long as it supports the ability to at least initially store, and later retrieve the information contained therein.

FIGS. 3 and 4 each illustrate an exemplary timing diagram of the communication signals conveyed between the wireless communication device 52 and/or mobile station 12 and one or more of the wireless local area network, and the cellular network 60, in accordance with at least a couple of embodiments of the present invention. More specifically, FIG. 3 illustrates a timing diagram for systems which support multiple concurrent communication connections, and FIG. 4 illustrates a timing diagram for systems, which support a single communication connection, that needs to be shared for purposes of communicating between the wireless communication device 52 and the cellular network 60 or the wireless local area network. In the case of a CDMA cellular network and an IEEE 802.11 wireless local area network, the data rates and corresponding throughput can occur much more quickly via the wireless local area network, and consequently in the single transceiver case the amount of time required supporting communication with the wireless local area network can often be minimized.

Relative to FIG. 3, the mobile station 12, sometimes referred to as a mobile subscriber, scans 100 for the presence of a wireless local area network in the present proximity of the mobile station 12. In at least some instances the mobile station 12 will send a probe request 102. The mobile station will then wait for any response 104 from a wireless local area network, indicative of the mobile station 12 being within the corresponding coverage area of the wireless local area network.

Upon receipt of the response to the probe, the mobile station 12 will attempt to authenticate 106 itself with the basic service set 62, which may include one or more transmissions, which if successful will result in an indication that the mobile station has been authenticated 108. Upon authentication 106, the mobile subscriber will communicate 110 a handoff request to the cellular network, which typically will include the basic service set information. The mobile station 12, will then attempt to perform an association 112 with the basic service set 62 and the wireless local area network.

As part of the association 112, the mobile station 12 will send a corresponding association request 114 to the wireless local area network. When the mobile station 12 has been associated, the wireless local area network will respond with a corresponding confirmation 116. The wireless local area network and the mobile station will then attempt to establish a secure tunnel 118 used to convey secure information. The mobile station then receives a handoff direction message 120 for the mobile station 12 to fully transition to the wireless local area network, at about the same time that data transmissions begin 122 on the wireless local area network. During this time, the same data may be being communicated concurrently via each of the cellular network 60 and the wireless local area network.

While data is being communicated concurrently, on each of the cellular network and the wireless local area network, the packets can be received via either connection. If duplicate data is received, the duplicate information can be discarded. If information is missed, than the retransmission of the information can be requested. Depending upon the type of connection, it may be possible to ignore a certain amount of any lost data or information.

After a period of time corresponding to the handoff duration 124, upon completion of the handoff, the mobile station 12 will send a handoff completion message 126 to the cellular network 60, via the wireless local area network. Upon receipt of which, the cellular network will generally cease communicating information directly to the mobile station 12, in effect completing the handoff.

According to at least one embodiment, the cellular network can transmit a handoff direction message 120 after commencing the transmission of data 122 on the wireless local area network.

FIG. 4 illustrates a corresponding case, where only a single transceiver 56 is used to support communication with both of the wireless local area network and the cellular network 60. The order of the signals conveyed is largely the same as discussed in connection with FIG. 3. However FIG. 4 further illustrates the corresponding periods of time in which the shared transceiver is tuned to each of the respective networks. Solid lines are intended to identify the periods during which the mobile station 12 is tuned to the particular network.

The discussed timing diagrams are intended to illustrate, by way of example, one possible sequence of timing signals, which can be used in connection with the present invention. However one skilled in the art will readily recognize that modifications can be made relative to at least some of the particular timing, without departing from the teachings of the present invention.

Figures 5, 6:
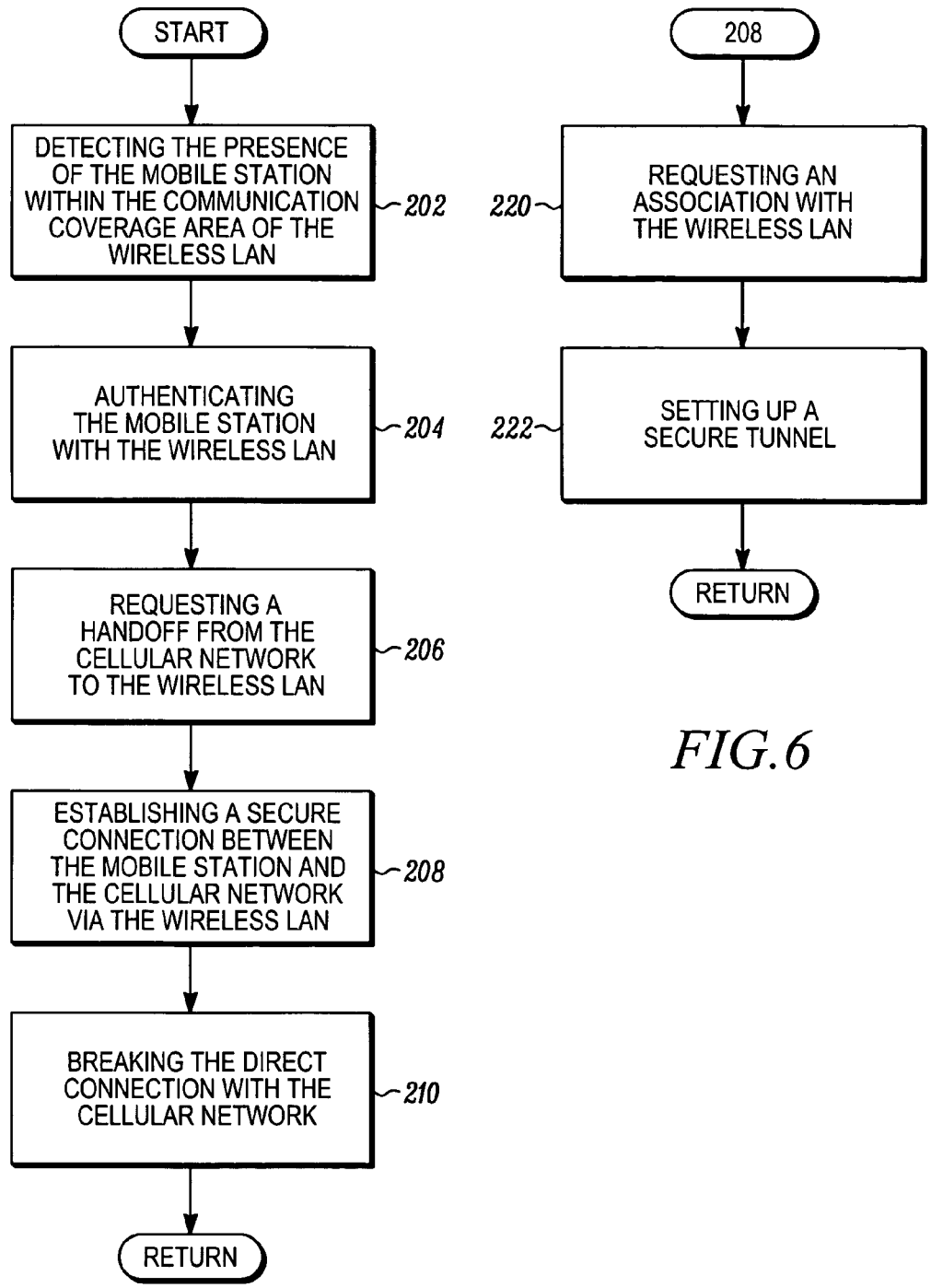
FIG. 5 is a flow diagram of a method for making a secure transfer of a mobile station communication connection from a direct connection with a cellular network to a connection via a wireless local area network, in accordance with at least one embodiment of the present invention.
FIG. 6 is a more detailed flow diagram of a method for establishing a secure connection between the mobile station and the cellular network via the wireless local area network.

FIG. 5 illustrates a flow diagram 200 of a method for making a secure transfer of a mobile station communication connection from a direct connection with a cellular network to a connection via a wireless local area network, in accordance with at least one embodiment of the present invention. The method includes detecting 202 the presence of the mobile station within the communication coverage area of the wireless local area network. The mobile station is then authenticated 204 with the wireless local area network. A handoff request 206 is then sent from the cellular network to the wireless local area network. A secure connection is then established 208 between the mobile station and the cellular network, via the wireless local area network. The direct connection with the cellular network is then broken 210, thereby effecting the secure transfer of the communication connection.

FIG. 6 is a more detailed flow diagram of a method for establishing 208 a secure connection between the mobile station and the cellular network via the wireless local area network, in accordance with at least one embodiment, where as part of establishing 208 a secure connection, an association with the wireless local area network is requested 220, and a secure tunnel is set up 222.

While the preferred and other embodiments of the invention have been illustrated and described, it will be clear that the invention is not so limited. Numerous modifications, changes, variations, substitutions, and equivalents will occur to those of ordinary skill in the art without departing from the spirit and scope of the present invention as defined by the following claims.

What is claimed is:

1. A method for making a secure transfer of a mobile station communication connection from a direct connection with a cellular network to a connection via a wireless local area network, the method comprising:
    detecting by a mobile station, the presence of the mobile station within the communication coverage area of a wireless local area network;
    authenticating the mobile station with the wireless local area network; requesting a handoff from the cellular network to the wireless local area network;
    establishing a secure connection between the mobile station and the cellular network via the wireless local area network, wherein establishing the secure connection between the mobile station and the cellular network via the wireless local area network includes the setup of a secure tunnel, and wherein upon establishing the secure connection between the mobile station and the cellular network via the wireless local area network, communication of information via the wireless local area network is initiated; and
    breaking the direct connection with the cellular network, after establishing the secure connection between the mobile station and the cellular network via the wireless local area network, wherein the communication of information via the wireless local area network prior to breaking the direct connection with the cellular network will include the same information being communicated concurrently via the direct connection and the secure connection via the wireless local area network.

2. A method in accordance with claim 1 wherein detecting by a mobile station within the communication coverage area of a wireless local area network includes:
    sending a probe request within the proximity of the mobile station; and
    receiving a response to the probe request from the wireless local area network.

3. A method in accordance with claim 1 wherein detecting by a mobile station within the communication coverage area of a wireless local area network includes:
    scanning for communications associated with a wireless local area network.

4. A method in accordance with claim 3 wherein scanning for communications associated with a wireless local area network includes receiving communications from a wireless local area network and adjusting a timer for synchronization to a basic service set.

5. A method in accordance with claim 1 wherein requesting a handoff from the cellular network to the wireless local area network includes sending information that enables the cellular network to identify the mobile station via the wireless local area network.

6. A method in accordance with claim 5 wherein sending information that enables the cellular network to identify the mobile station via the wireless local area network includes sending basic service set information to the cellular network.

7. A method in accordance with claim 1 wherein establishing a secure connection between the mobile station and the cellular network via the wireless local area network includes requesting an association with the wireless local area network.

8. A method in accordance with claim 1 wherein breaking the direct connection with the cellular network includes sending an indication of handoff completion via the wireless local area network.

9. A method in accordance with claim 8 wherein the communication of information via the direct connection is terminated in response to receiving the indication of handoff completion.

10. A method in accordance with claim 1 wherein the communication connection is a circuit switched connection.

11. A method in accordance with claim 1 wherein the communication connection is a packet data connection.

12. A wireless communication device comprising:
a wireless communication interface including one or more transceivers which are configured for establishing a wireless communication connection; and
a controller configured for making a secure transfer of a communication connection from a direct connection with a cellular network to a connection via a wireless local area network, the controller including
a detection module configured for detecting the presence of the wireless communication device within the communication coverage area of a wireless local area network,
an authentication module configured for establishing the identity of the wireless communication device and the authority of the wireless communication device to communicate via the wireless local area network and initiating a handoff request from the cellular network to the wireless local area network, and
an association module configured for establishing a secure connection between the wireless communication device and the cellular network via the wireless local area network, wherein establishing the secure connection between the mobile station and the cellular network via the wireless local area network includes the setup of a secure tunnel, and wherein upon establishing the secure connection between the mobile station and the cellular network via the wireless local area network, communication of information via the wireless local area network is initiated; and
configured for instructing the cellular network to break the direct connection with the cellular network, after the secure connection between the wireless communication device and the cellular network via the wireless local area network is established, wherein the communication of information via the wireless local area network prior to breaking the direct connection with the cellular network will include the same information being communicated concurrently via the direct connection and the secure connection via the wireless local area network.

13. A wireless communication device in accordance with claim 12 wherein the controller is configured to support the concurrent reception of information via the direct connection with the cellular network and the connection via the wireless local area network, after the secure connection is established and before the direct connection is broken.

14. A wireless communication device in accordance with claim 12 wherein the wireless communication interface includes a first transceiver configured for communicating with the cellular network and a second transceiver configured for communicating with the wireless local area network.

15. A wireless communication device in accordance with claim 12 wherein the wireless communication interface includes a single transceiver configured for alternatively communicating with the cellular network and the wireless local area network.

16. A wireless communication device in accordance with claim 12 wherein the wireless communication device is a radio telephone.

17. A wireless communication device in accordance with claim 12 wherein the cellular network is a Code Division Multiple Access (CDMA) network.

18. A wireless communication device in accordance with claim 12 wherein the wireless local area network is IEEE 802.11 compliant.

* * * * *